(12) United States Patent
Fang et al.

(10) Patent No.: US 12,442,132 B2
(45) Date of Patent: Oct. 14, 2025

(54) METHOD FOR PRODUCING DENIM-EFFECT GARMENTS

(71) Applicant: Guangzhou Xiyin International Import and Export Co., Ltd., Guangzhou (CN)

(72) Inventors: Wenjie Fang, Guangzhou (CN); Xinlou Qu, Guangzhou (CN); Bei Li, Guangzhou (CN); Yong Deng, Guangzhou (CN); Zhipeng Zhong, Guangzhou (CN); Ying Zhang, Guangzhou (CN)

(73) Assignee: Guangzhou Xiyin International Import and Export Co., Ltd., Guangzhou (CN)

( * ) Notice: Subject to any disclaimer, the term of this patent is extended or adjusted under 35 U.S.C. 154(b) by 266 days.

(21) Appl. No.: 18/057,129

(22) Filed: Nov. 18, 2022

(65) Prior Publication Data

US 2023/0220615 A1   Jul. 13, 2023

(30) Foreign Application Priority Data

Jan. 11, 2022   (CN) .......................... 202210028272.7

(51) Int. Cl.
*D06P 5/24* (2006.01)
*D06P 1/38* (2006.01)
(Continued)

(52) U.S. Cl.
CPC ................ *D06P 5/003* (2013.01); *D06P 1/38* (2013.01); *D06P 1/50* (2013.01); *D06P 1/628* (2013.01); *D06P 1/642* (2013.01); *D06P 1/65125* (2013.01)

(58) Field of Classification Search
CPC .... D06P 5/003; D06P 1/38; D06P 1/50; D06P 1/628; D06P 1/642; D06P 1/65125;
(Continued)

(56) References Cited

U.S. PATENT DOCUMENTS

2012/0145022 A1\* 6/2012 Dickinson ................ B41M 1/10
101/287
2022/0090317 A1\* 3/2022 Nakano ................... D21H 19/62

FOREIGN PATENT DOCUMENTS

CN      103205906 A        7/2013
CN      105544244 A  \*    5/2016
(Continued)

*Primary Examiner* — S. Behrooz Ghorishi
(74) *Attorney, Agent, or Firm* — Steinfl + Bruno, LLP

(57) ABSTRACT

A method is disclosed for producing denim-effect garments by the following steps: 1) printing a reactive dye ink onto a PET film to form a pattern thereby obtaining a transfer printed PET film; 2) transfer printing a base pulp-treated fabric by attaching the transfer printed PET film thereby obtaining a denim-effect fabric; 3) cutting, sewing, washing to soften, and drying the denim-effect fabric and thereby obtaining a denim-effect garment. The method has the advantages of simple production, being environmentally friendly, having high efficiency, and being suitable for flexible fabrics, and the produced denim-effect garment of the invention has the advantages of having a good color fastness to rubbing, washing resistance, and having a diversity of patterns, and are suitable for large-scale production and application.

8 Claims, 15 Drawing Sheets

(51) Int. Cl.
*D06P 1/50* (2006.01)
*D06P 1/62* (2006.01)
*D06P 1/642* (2006.01)
*D06P 1/651* (2006.01)

(58) Field of Classification Search
CPC .......... D06P 5/007; D06P 3/66; D06P 5/2077; D06P 1/48; D06P 1/6735; D06P 5/002; D06P 5/008; D06P 5/04; D06P 5/08; D06P 5/22; D06P 7/00; D06P 1/6491; D06P 1/67383
See application file for complete search history.

(56) References Cited

FOREIGN PATENT DOCUMENTS

| | | | | | |
|---|---|---|---|---|---|
| CN | 107190526 A | * | 9/2017 | | |
| CN | 108385410 A | | 8/2018 | | |
| CN | 108928148 A | * | 12/2018 | ............ | B41M 5/025 |
| CN | 109914126 A | | 6/2019 | | |
| CN | 113337948 A | * | 9/2021 | | |
| DE | 0211328 A2 | * | 2/1987 | .............. | D06P 3/828 |
| WO | 2011/126187 A1 | | 10/2011 | | |

* cited by examiner

| Test items | | Embodiment 1 | Embodiment 2 | Embodiment 3 | Embodiment 4 | Comparative Embodiment 1 | Comparative Embodiment 2 | Comparative Embodiment 3 |
|---|---|---|---|---|---|---|---|---|
| Grades of color fastness to rubbing | Dry rubbing | 4-5 | 4-5 | 4-5 | 4-5 | 4-5 | 4-5 | 4 |
| | Wet rubbing | 4 | 4 | 4 | 3-4 | 2-3 | 1-2 | 2 |
| Whithe cotton after test | Dry rubbing | | | | | | | |
| | Wet rubbing | | | | | | | |
| Denim garment | | | | | | | | |
| Fabric | | 100% cotton twill woven fabric | 100% cotton twill woven fabric | 100% cotton twill woven fabric | 95% cotton+ 5% spandex knitted loop | 100% cotton twill woven fabric | 100% cotton twill woven fabric | 100% cotton twill woven fabric |

Fig. 15

METHOD FOR PRODUCING DENIM-EFFECT GARMENTS

CROSS-REFERENCE TO RELATED APPLICATIONS

The present application claims priority to Chinese Patent Application No. 2022100282727 filed on Jan. 11, 2022, the contents of which are incorporated by reference herein in its entirety.

TECHNICAL FIELD

The present invention relates to the technical field of textile production, and in particular to a manufacturing method for denim-effect garment.

BACKGROUND

Denim is currently a popular category of clothing. Garments can be given a denim-effect by using various patterns on fabric to improve the attractiveness of the garment. The production of denim-effect garments in the prior art typically uses the following process: warp pulp dyeing-weaving-finishing-cutting-sewing-hand-washing then texture effect-ironing-packaging. However, the denim garments produced by the prior art are usually dyed with vat dyes, such as indigo, which are difficult to clean in the production process and have a great impact on the environment and on the health of the workers.

In addition, the production method of denim-effect clothing in the prior art has the problem that the effect produced in a given batch of denim-effect garments is inconsistent due to fact that there are a large number of manual steps in the production process, and the manual steps being performed inconsistently, so it is not suitable for clothing with requiring high color fastness, due to the effect differences between the garments and the poor color fastness to wet rubbing.

Therefore, it is important to develop a method for producing denim-effect garments with low costs, simple processes, environmental protections, high efficiency, consistency of the same batch of denim-effect garments, and good color fastness to wet rubbing.

SUMMARY

In order to overcome issues existing in the prior art, the invention aims to provide an improved method for producing denim-effect garments.

In a first aspect, a method for producing denim-effect garments is disclosed, the method comprising:
1) printing a reactive dye ink onto a PET film to form a pattern to obtain a transfer printed PET (polyethylene terephthalate) film;
2) transfer printing by attaching the transfer printed PET film to a base pulp-treated fabric to obtain a denim-effect fabric;
3) cutting, sewing, washing to soften, and drying the denim-effect fabric, so as to obtain a denim-effect garment.

In some embodiments, step 1) further includes nesting and/or directly covering the images obtained after scanning on a template with a garment shape.

In some embodiments, in step 1), a dye of the reactive dye ink is one or more of K-type dye, M-type dye, KN-type dye and P-type dye.

In some embodiments, in step 1), a mass fraction of the dye in the reactive dye ink is 5% to 20%.

In some embodiments, in step 1), a transfer printing rate of the PET film is 90% to 99%.

In some embodiments, in step 1), a thickness of the PET film is 5 μm to 30 μm.

In some embodiments, in step 1), a shrinkage rate generated by subsequent processes is reserved when printing.

In some embodiments, in step 2), the base pulp comprises a hygroscopic agent, an alkali agent, an anti-reducing agent and a thickening agent.

In some embodiments, a concentration of the hygroscopic agent is 50 g/L-200 g/L.

In some embodiments, a concentration of the thickening agent is 5 g/L-50 g/L.

In some embodiments, a concentration of the alkali agent is 2 g/L-50 g/L.

In some embodiments, a concentration of the anti-reducing agent is 0.5 g/L-3 g/L.

In some embodiments, the hygroscopic agent is urea.

In some embodiments, the thickening agent is one or more of sodium alginate, modified starch and modified cellulose.

In some embodiments, the alkali agent is one or more of sodium hydroxide, sodium carbonate, sodium bicarbonate and sodium silicate.

In some embodiments, the anti-reducing agent is 3-nitrobenzenesulfonic acid sodium salt.

In some embodiments, in step 2), the base pulp-treated fabric to be printed is prepared from the fabric to be printed by pad-batching or coating treatment.

In some embodiments, in step 2), the fabric to be printed is woven from cellulose fiber and/or regenerated cellulose fiber.

In some embodiments, in step 2), the fabric to be printed may be a blended or interwoven fabric.

In some embodiments, in step 2), the fabric to be printed is a woven or knitted fabric.

In some embodiments, in step 2), the amount of the base pulp applied is 50% to 100% of the mass of the fabric to be printed.

In some embodiments, in step 2), a temperature of the transfer printing is 10° C. to 40° C.

More In some embodiments, in step 2), a temperature of the transfer printing is 15° C. to 35° C.

In some embodiments, in step 2), the specific operation of the transfer printing includes: attaching the transfer printed PET film and a base pulp-treated fabric to be printed; and then transferring the pattern by roller pressure.

In some embodiments, in step 2), a pressure of the transfer printing is 0.1 MPa to 0.8 MPa.

In some embodiments, in step 2), a speed of the transfer printing is 2 m/min to 25 m/min.

In some embodiments, in step 3), the washing to soften uses a softener to treat the fabric.

In some embodiments, in step 3), the softener is one or more of silicon soft oil, polyurethane, polyethylene and stearic acid.

In some embodiments, in step 3), the washing to soften is performed at 20° C. to 60° C. with a treatment time of 5 min-30 min.

In some embodiments, step 3) further comprises steps of steaming, washing and shaping.

Specifically, the function of the washing is to obtain the fabric with denim-effect and enhance its color fastness after cleaning and transfer printing. The function of the washing to soften is to depulp and soften the denim-effect garment, making the garment softer. The function of shaping is convenient for cutting and sewing, conducive to the alignment of woven fabrics, and can prevent dislocation due to easy curling of the fabric itself during the cutting and sewing process, thereby improving sewing efficiency.

In some embodiments, a pressure of the step of steaming is 0.1 MPa to 0.5 MPa; a temperature of the step of steaming is 95 to 110° C.; and a time of the step of steaming is 3 min to 15 min.

In some embodiments, the washing includes washing with cold water, washing with warm water, neutralization and soaping.

In some embodiments, the step of shaping is performed by adding a shaping additive to the transfer printed fabric and performing a stiffening treatment.

In some embodiments, a dosage of the shaping additive is 2 g/L-40 g/L.

More In some embodiments, the dosage of the shaping additive is 5 g/L-20 g/L.

In some embodiments, the shaping additive comprises one or more of natural starch, cellulose, modified starch and guar gum.

Specifically, it is useful to add a shaping additive (thickening agent) into the formulation of woven fabric, and to perform a stiffening treatment on the printed fabric, to ensure that the finished fabric is suitable for subsequent sewing processing.

In some embodiments, in step 3), a temperature of the drying is 50° C.-100° C.

The beneficial effects of the invention are as follows:

The method for producing denim-effect garments of the invention has the advantages of simple production, being environmentally friendly, having high efficiency, and being suitable for flexible fabrics, and the produced denim-effect garment of the invention has the advantages of having a good color fastness to rubbing, washing resistance, and having a diversity of patterns, and are suitable for large-scale production and application. Specific advantages include:

(1) the overall water consumption in the printing and dyeing process of the denim-effect garment of the invention can be reduced by 50%-80% compared with the traditional denim process, and the energy consumption is also significantly reduced;

(2) the method for producing denim-effect garments of the invention can shorten the production time by 2-10 days according to the different styles and effects;

(3) the method for producing denim-effect garments of the invention does not need to be obtained by washing water containing a large number of additives, and washing water processing does not use pumice, enzyme, oxidant, reducing agent, fixing agent, surfactant and other chemical additives, so as to reduce the burden of wastewater treatment of the production enterprise and reduce the damage to the strength of the fabric;

(4) all operation steps involved in the method of the invention are clean and safe, without peculiar smell and dust problems, and have little impact on the health of employees;

(5) the denim-effect garment produced by the invention has good color fastness, less color fading in the process of wearing and using by consumers, and less dye discharged into domestic sewage in the washing process;

(6) the invention implements a method of transfer printing: the raised position of the twill fabric is darker than the sunken position, and the obtained alternating effect of dark and light colors is close to the effect of washing and grinding white, and is closer to the denim-effect of washing and grinding white than that of other printing methods;

(7) the denim-effect garment produced by the method of the invention has the advantages of flexible printing patterns and effects, rich colors, controllable pattern size etc., which can provide consumers with more selections and improve production competitiveness;

(8) the denim-effect garment produced by the invention can reduce the total production cost by 15%-50% compared with the denim-effect garments produced by the traditional technology, and the production process is simple and environmentally friendly, which is convenient for large-scale production and promotion and application.

BRIEF DESCRIPTION OF DRAWINGS

FIG. 15 is an example test result diagram of color fastness to rubbing of denim-effect garments according to embodiments herein.

DETAILED DESCRIPTION

The technical solutions in the example embodiments herein are clearly and completely described below with reference to the accompanying drawings. Obviously, the described embodiments are only a part of the embodiments described herein. Based on the disclosure herein, all other embodiments obtained by those of ordinary skill in the art without creative efforts shall fall within the protection scope of the claims provided.

Example Embodiment 1

Specifications of the fabric to be printed: 10S/1×10S/1, 100% cotton twill woven fabric, semi-bleaching, gram weight 270 g/m$^2$, width 150 cm.

The composition of the base pulp: urea 10%, sodium bicarbonate 3%, 3-nitrobenzenesulfonic acid sodium salt 1%, sodium alginate 2%, the rest is water (by mass percentage).

Figure 2:
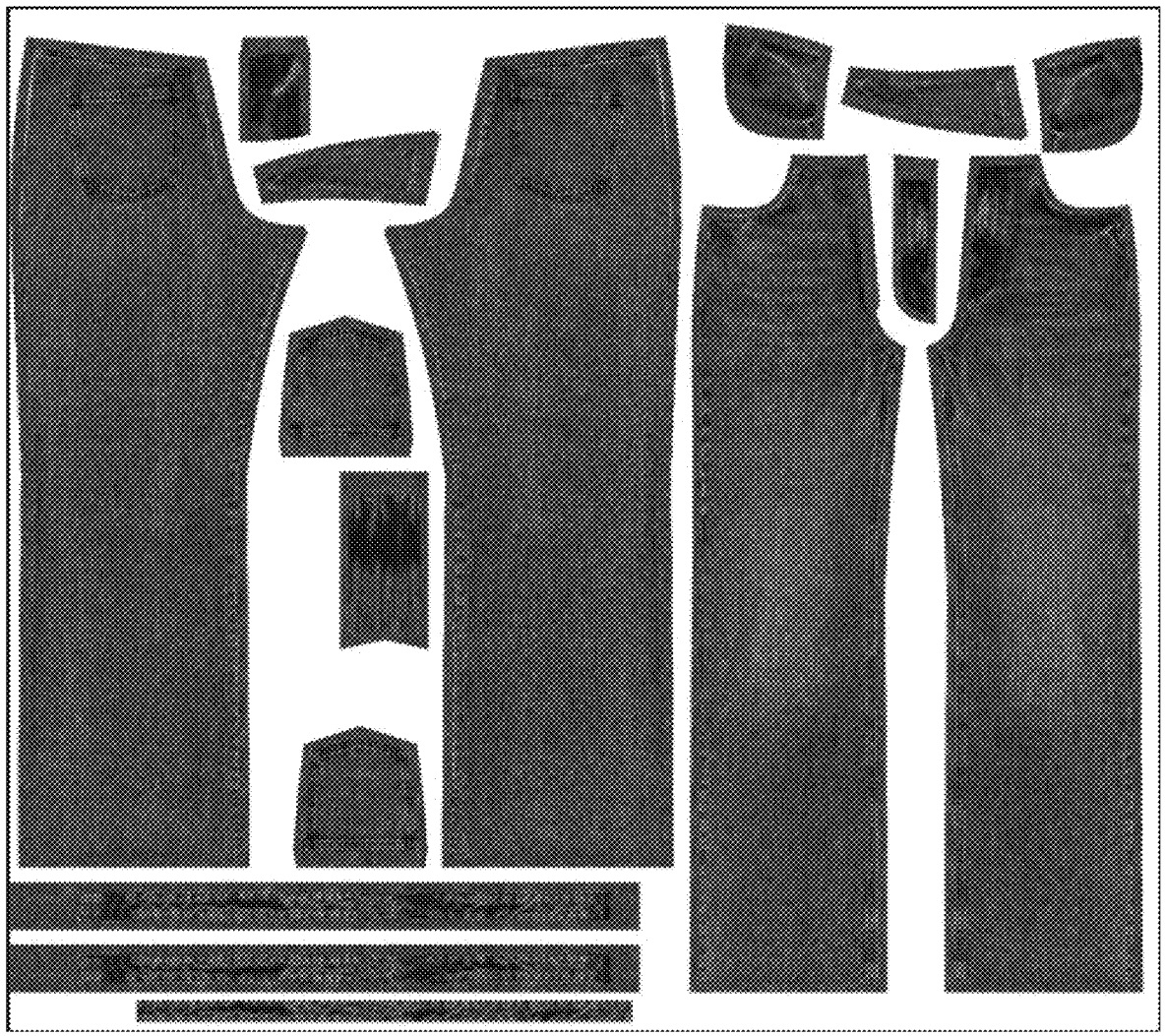
FIG. 2 is an example material diagram obtained by scanning sample clothes according to embodiments herein.
Figure 3:
FIG. 3 is an example front side effect diagram of a garment according to embodiments herein.
Figure 4:
FIG. 4 is an example back side effect diagram of a garment according to embodiments herein.

A method for producing denim-effect garments comprises following steps: (see FIG. 1):
1) Extracting printing materials (105): scanning the sample clothes or images to obtain the image materials to be printed;
2) Nesting paper patterns (110) and generating printing files (115): nesting the image materials to be printed on the paper patterns and generating image files, as shown e.g., in FIG. 2;
3) Printing transfer printing substrate (120): setting the shrinkage rate of reserved printing and clothing general washing and softening, and using an active ink to print the image files on the transfer printing substrate (coating PET film with the thickness of 14 μm) to obtain transfer printing film;
4) Cold transfer printing film (125): immersing the fabric to be printed in the base pulp, and then pad-batching the fabric to be printed by the uniform padder (a pressure of the padder is 0.51 MPa, after pad-batching, the application amount of the base pulp of the fabric to be printed is about 80%); after pad-batching, attaching the front side of the fabric to be printed with the printing surface of the transfer printing film, and sending them to a cold transfer printing roller (applying pressure of 0.3 MPa, transfer printing speed of 5 m/min). After drying (drying in the oven, drying temperature is 80° C.), the printed fabric (130) is obtained.
5) Steaming (135): feeding the printed fabric into a steaming process (steaming temperature is 102° C., steam pressure is 0.3 MPa, steaming time is 10 mins).
6) Post-processing: the steamed fabric is washed (140), shaped (145), cut (150), sewn (155), washed and dried (160), and ironed (165) to obtain the denim-effect garment (for example, twill jeans with front and back side effects as shown in FIG. 3 and FIG. 4 respectively);

in this example, the shaping composition is 20 g/L corn starch; washing and drying includes the first washing (0.5 g/L α-amylase, bath ratio: 1:20, processing at 40° C. for 20 minutes), the second washing (2 g/L softener CWS-5™ of NANFENG DAXIN TECHNOLOGY CO., LTD, bath ratio: 1:20, processing at 40° C. for 20 minutes), draining, dehydrating and drying (drying temperature is 70° C.).

Example Embodiment 2

Specifications of the fabric to be printed: 10S/1×7S/1 cotton twill, gram weight 310 g/m², width 150 cm.

The composition of the base pulp: urea 12%, sodium bicarbonate 2%, 3-nitrobenzenesulfonic acid sodium salt 1%, sodium alginate 3%, the rest is water (by mass percentage).

Figure 1:
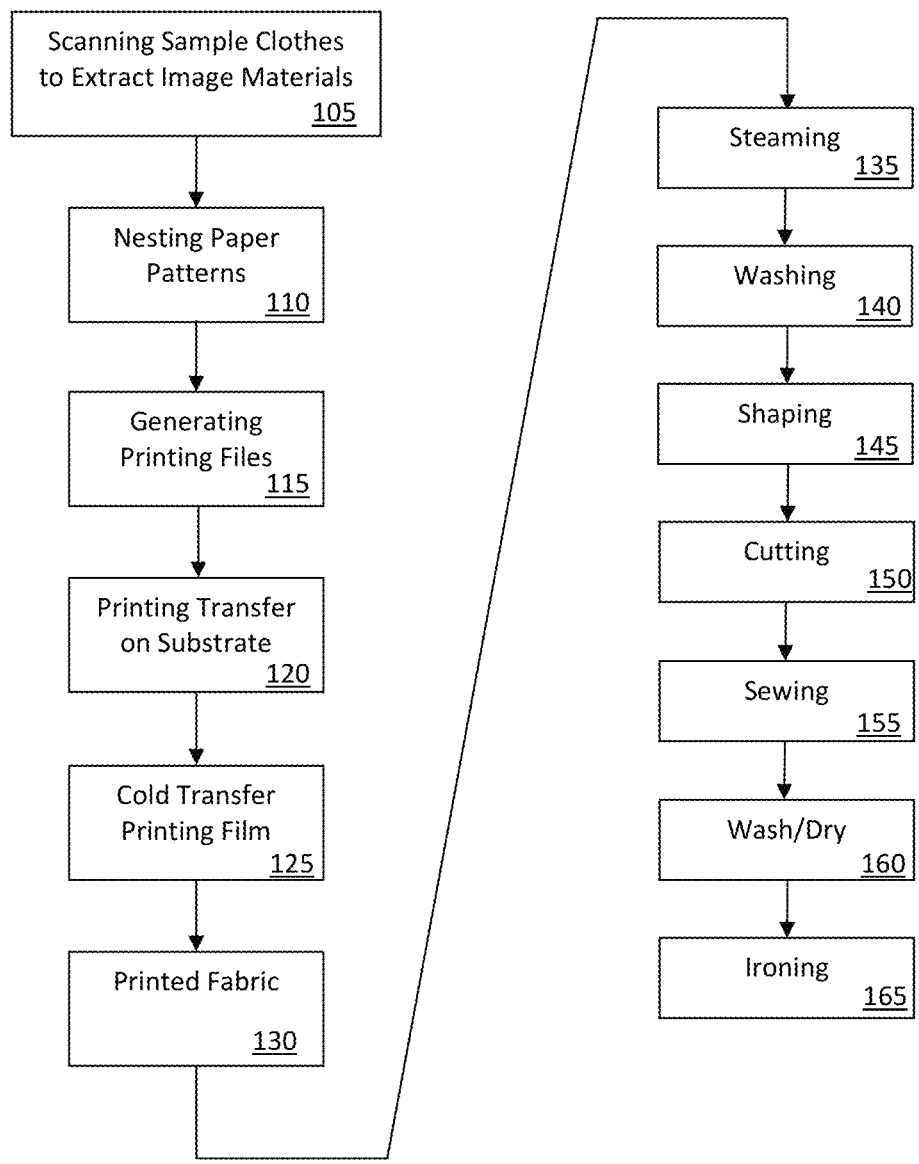
FIG. 1 is an example flow chart of producing denim-effect garments according to embodiments herein.
Figure 5:
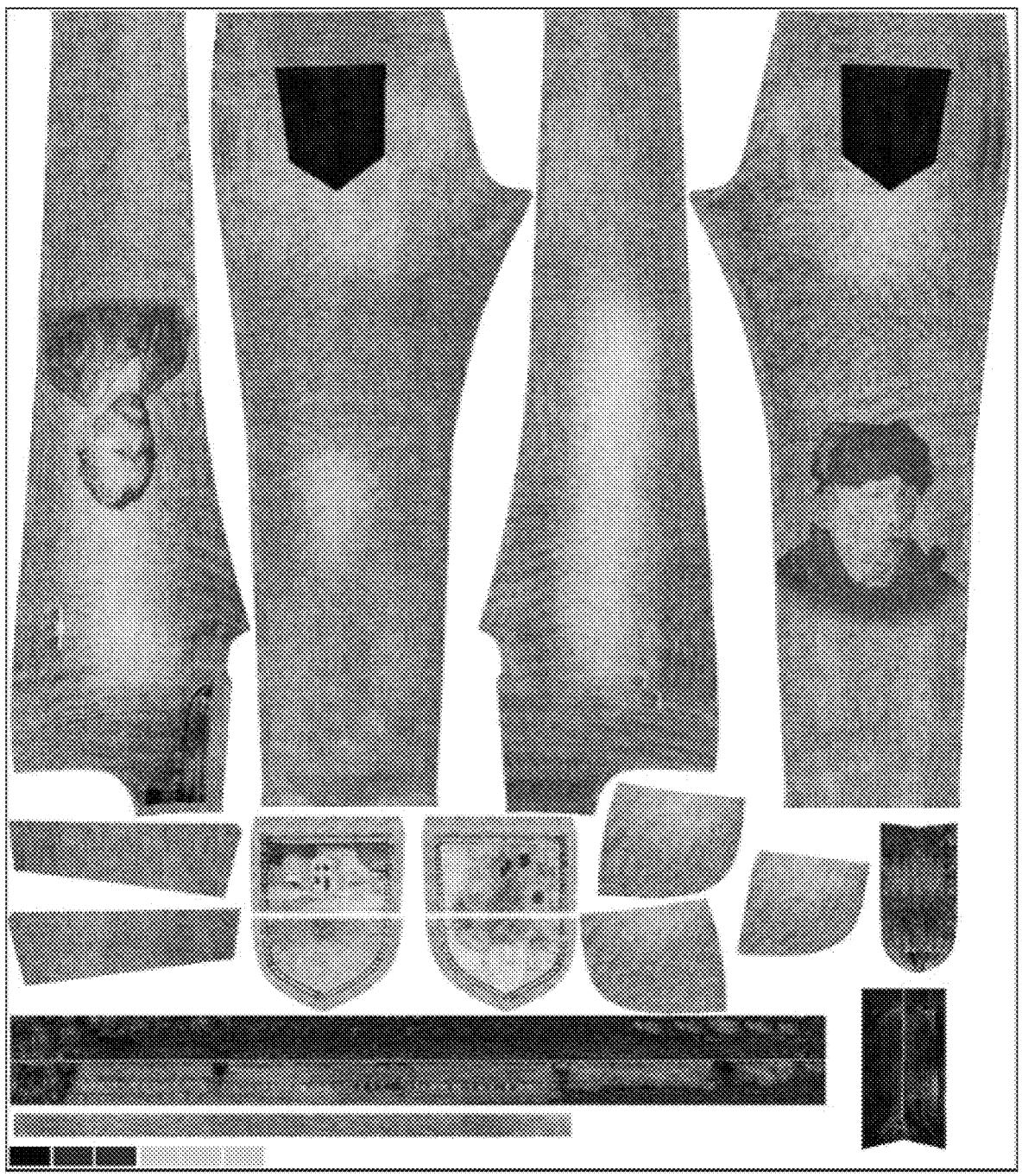
FIG. 5 is an example material diagram obtained by scanning sample clothes according to embodiments herein.
Figure 6:
FIG. 6 is an example front side effect diagram of a garment according to embodiments herein.
Figure 7:
FIG. 7 is an example back side effect diagram of a garment according to embodiments herein.

A method for producing denim-effect garments comprises following steps (the process is basically the same as shown for Example Embodiment 1, see FIG. 1):
1) Extracting printing materials: scanning the sample clothes or images to obtain the image materials to be printed;
2) Nesting paper patterns and generating printing files: nesting the image materials to be printed on the paper patterns and generating image files, as shown in FIG. 5;
3) Printing transfer printing substrate: setting the shrinkage rate of reserved printing and clothing general washing and softening, and using an active ink to print the image files on the transfer printing substrate (coating PET film with the thickness of 12 μm) to obtain transfer printing film;
4) Cold transfer printing film: immersing the fabric to be printed in the base pulp, and then pad-batching the fabric to be printed by the uniform padder (a pressure of the padder is 0.6 MPa, after pad-batching, the application amount of the base pulp of the fabric to be printed is about 85%); after pad-batching, attaching the front side of the fabric to be printed with the printing surface of the transfer printing film, and sending them to a cold transfer printing roller (applying pressure of 0.4 MPa, transfer printing speed of 4 m/min). After drying (drying in the oven, drying temperature is 100° C.), the printed fabric is obtained.
5) Steaming: feeding the printed fabric into a steaming process;
6) Post-processing: the steamed fabric is washed, shaped, cut, sewn, washed, dried and ironed to obtain the denim-effect garment (namely, twill jeans with front and back side effects as shown in FIG. 6 and FIG. 7 respectively);

in this case, the shaping composition is 20 g/L corn starch; washing and drying includes the first washing (0.5 g/L α-amylase, bath ratio: 1:20, processing at 40° C. for 20 minutes), the second washing (2 g/L amino silicone oil, bath ratio: 1:20, processing at 40° C. for 20 minutes), draining, dehydrating and drying (drying temperature is 80° C.).

Example Embodiment 3

Specifications of the fabric to be printed: 7S/1×7S/1, 100% cotton, gram weight 320 g/m², width 150 cm.

The composition of the base pulp: urea 10%, sodium bicarbonate 3%, 3-nitrobenzenesulfonic acid sodium salt 1%, sodium alginate 2%, and the rest is water (by mass percentage).

Figure 8:
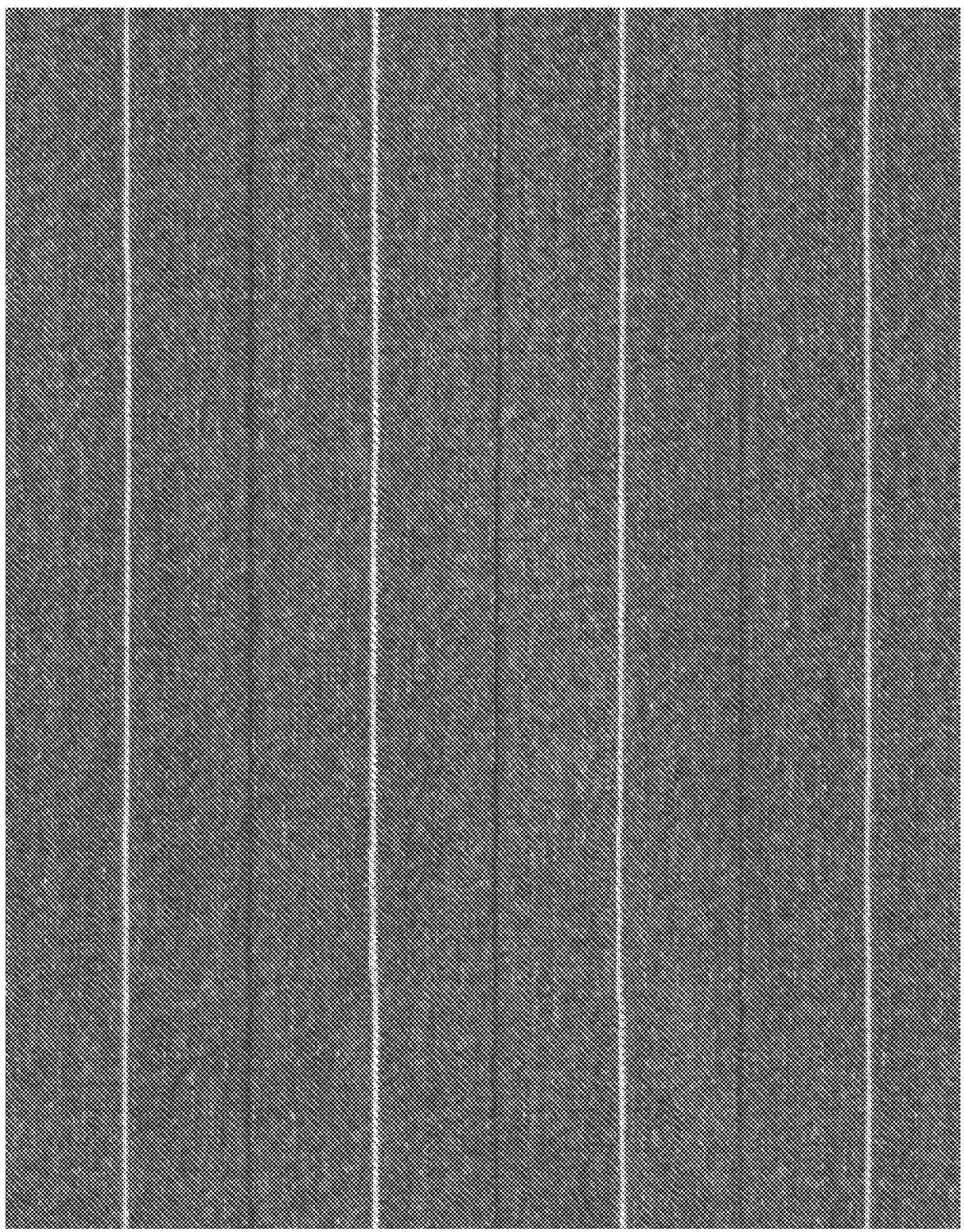
FIG. 8 is an example material diagram according to embodiments herein.

In some embodiments, a method for producing denim-effect garments comprises following steps (the difference between this process and the method of Example Embodiment 1 is that there is no need for nesting image pattern, but rather it is directly cyclically connected to the whole image):
1) Extracting printing materials: scanning the sample clothes or images to obtain the image materials to be printed;
2) Generating printing files: directly cyclically connecting the images to be printed to the whole image and generating image files, as shown in FIG. 8;
3) Printing transfer printing substrate: setting the shrinkage rate of reserved printing and clothing general washing and softening, and using an active ink to print the image files on the transfer printing substrate (coating PET film with the thickness of 14 μm) to obtain transfer printing film;
4) Cold transfer printing film: immersing the fabric to be printed in the base pulp, and then pad-batching the fabric to be printed by the uniform padder (a pressure of the padder is 0.5 MPa, after pad-batching, the application amount of the base pulp of the fabric to be printed is about 80%); after pad-batching, attaching the front side of the fabric to be printed with the printing surface of the transfer printing film, and sending them to a cold transfer printing roller (applying pressure of 0.3 MPa, transfer printing speed of 5 m/min). After drying (drying in the oven, drying temperature is 90° C.), the printed fabric is obtained.

Figure 9:
FIG. 9 is an example front side effect diagram of a garment according to embodiments herein.

5) Steaming: feeding the printed fabric into a steaming process;
6) Post-processing: the steamed fabric is washed, shaped, cut, sewn, washed, dried and ironed to obtain the denim-effect garment (namely, jeans with jacquard effect, and its front and back side effects are shown in FIG. 9 respectively);

in this case, the shaping composition is 10 g/L corn starch; washing and drying includes the first washing (0.3 g/L α-amylase, bath ratio: 1:20, processing at 40° C. for 20 minutes), the second washing (2 g/L amino silicone oil, bath ratio: 1:20, processing at 40° C. for 20 minutes), draining, dehydrating and drying (drying temperature is 80° C.).

Example Embodiment 4

Specifications of the fabric to be printed: 32S/1 cotton yarn+20 D spandex elastic wool circle knitted semi-bleaching fabric, gram weight 230 g/m$^2$, width 180 cm.

The composition of the base pulp: urea 12%, sodium bicarbonate 2%, 3-nitrobenzenesulfonic acid sodium salt 1%, sodium alginate 3%, the rest is water (by mass percentage).

Figure 10:
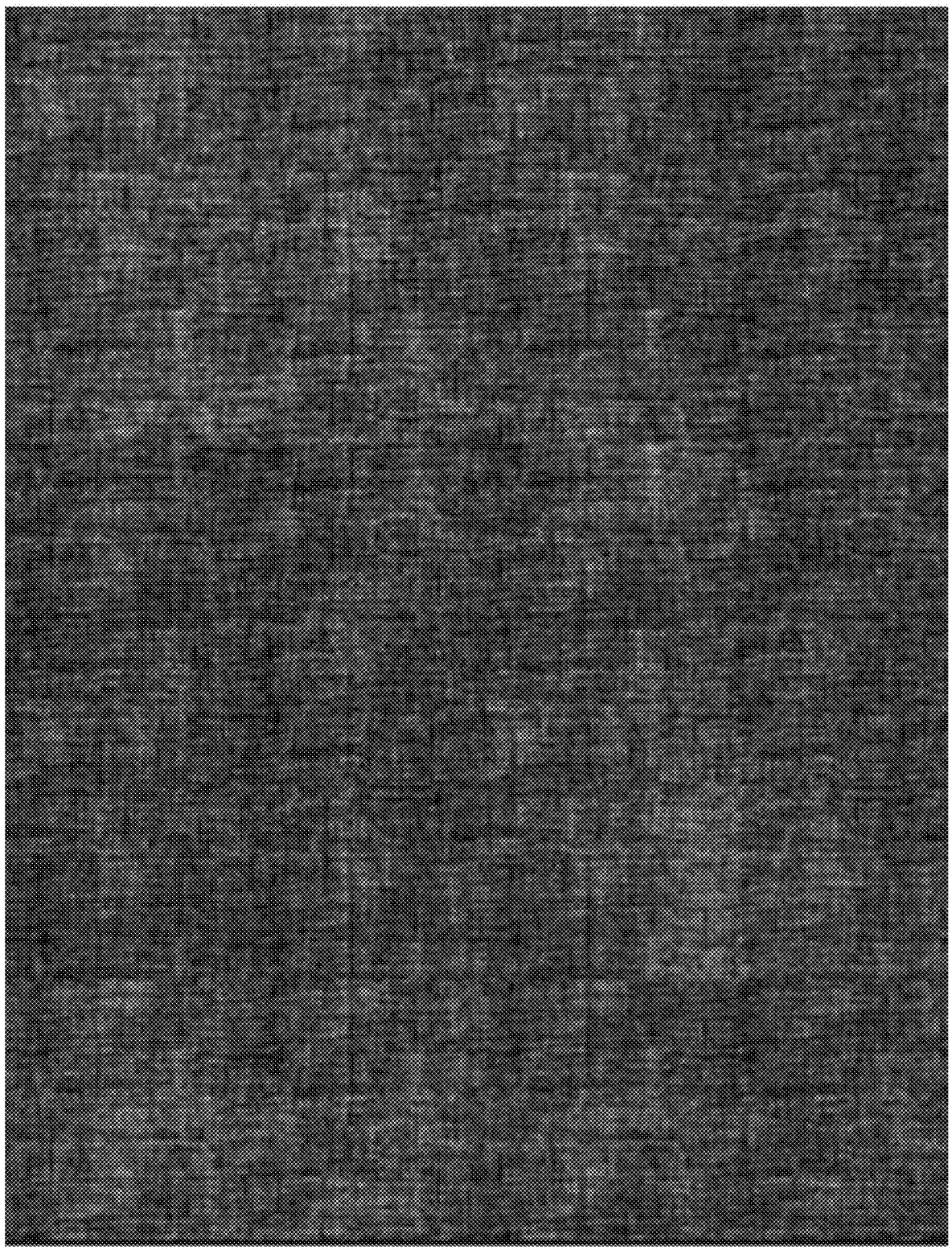
FIG. 10 is an example material diagram according to embodiments herein.
Figure 11:
FIG. 11 is an example front side effect diagram of a garment according to embodiments herein.

A method for producing denim-effect garments comprises following steps (similar to Example Embodiment 3, no nesting pattern is required):
1) Extracting printing materials: scanning the sample clothes or images to obtain the image materials to be printed;
2) Generating printing files: directly cyclically connecting the images to be printed to the whole image and generating image files, as shown in FIG. 10;
3) Printing transfer printing substrate: setting the shrinkage rate of reserved printing and clothing general washing and softening, and using an active ink to print the image files on the transfer printing substrate (coating PET film with the thickness of 12 μm) to obtain transfer printing film;
4) Cold transfer printing film: immersing the fabric to be printed in the base pulp, and then pad-batching the fabric to be printed by the uniform padder (a pressure of the padder is 0.6 MPa, after pad-batching, the application amount of the base pulp of the fabric to be printed is about 90%); after pad-batching, attaching the front side of the fabric to be printed with the printing surface of the transfer printing film, and sending them to a cold transfer printing roller (applying pressure of 0.35 MPa, transfer printing speed of 4 m/min). After drying (drying in the oven, drying temperature is 100° C.), the printed fabric is obtained.
5) Steaming: feeding the printed fabric into a steaming process;
6) Post-processing: the steamed fabric is washed, shaped, cut, sewn, washed, dried and ironed to obtain the denim-effect garment (namely, hooded denim sweater, and its front and back side effects are shown in FIG. 11 respectively);

in this case, the shaping composition is 1% amino silicone oil; washing and drying includes general washing and softening (1 g/L soft oil for CWS-5™, bath ratio: 1:20, processing at 40° C. for 20 minutes), draining, dehydrating and drying (drying temperature is 80° C.).

Unless otherwise specified, the accuracy of the scanner used in the manufacturing method of embodiments 1 to 4 should be above 300 dpi; the steaming temperature is 102° C., the steam pressure is 0.3 MPa, the steaming time is 10 mins; the step of washing uses an open-width washing machine, including pre-washing, washing with warm water, washing with hot water, soaping, washing with clean water, etc.; a setting machine is used to complete shaping, wherein the shaping temperature is 150° C., the shaping time is 90 seconds; the washing with water and the drying use a rotary cage washing machine and a drum dryer, respectively.

Comparative Embodiment 1

Figure 12:
FIG. 12 is an example front side effect diagram of a garment according to embodiments herein.

The method for producing denim-effect garments in Comparative Embodiment 1 (that is, denim pants, as shown in FIG. 12) and the method in Example Embodiment 1 differs in that: the Comparative Embodiment 1 uses the denim-effect garment produced by a washing method with indigo dye, the method includes: using VAT dyes to dye after warp yarn and weaving, sewing, denim-effect garment washing.

Comparative Embodiment 2

Figure 13:
FIG. 13 is an example front side effect diagram of a garment according to embodiments herein.

The method for producing denim-effect garments in Comparative Embodiment 2 (that is, denim pants, as shown in FIG. 13) and the method in Example Embodiment 1 differs in that: the Comparative Embodiment 2 uses the denim-effect garment produced by a washing method with indigo dye, the method includes: using VAT dyes to dye after warp yarn and weaving, sewing, denim-effect garment washing.

Comparative Embodiment 3

Figure 14:
FIG. 14 is an example front side effect diagram of a garment according to embodiments herein.

The method for producing denim-effect garments in Comparative Embodiment 3 (that is, denim pants, as shown in FIG. 14) and the method in Example Embodiment 1 differs in that: the Comparative Embodiment 3 uses the denim-effect garment produced by a washing method with indigo dye, the method includes: using VAT dyes to dye after warp yarn and weaving, sewing, denim-effect garment washing.

Color Fastness to Rubbing Test

Samples to be tested: denim-effect garments of Comparative Embodiments 1-3 and Example Embodiments 1-4.

Testing method for color fastness to rubbing: results are measured and rated in accordance with the ISO 105-X12: 2016 standard "Textiles—Tests for color fastness—Part X12: Color fastness to rubbing". In other words, a white cotton is used to rub against samples to be tested, and the staining of the white cotton is observed, so as to determine the color fastness of colored fabrics; wherein, the color fastness to rubbing increases sequentially from 1 to 5, where 1 represents the worst color fastness to rubbing, while 5 represents the best color fastness to rubbing.

The dyed denim-effect garments similar in color to indigo in Comparative Embodiments 1-3 are purchased in the market. The color fastness to rubbing test for denim-effect garments is carried out for Example Embodiments 1-4 and Comparative Embodiments 1-3. The results are shown in FIG. 15.

As shown in FIG. 15, the color fastness to rubbing test shows that: the color fastness to rubbing in both dry rubbing and wet rubbing of denim-effect garments in Example Embodiments 1-4 (1500) is better than that in Comparative Embodiments 1-3 (1510). The above test results demonstrate that the method in this invention can be used for different fabrics and it has following advantages of strong adhesive fastness, simple processes, environmental protection, safety, and garment washing resistance and no color fading, which is suitable for large-scale production.

The above embodiments are preferred embodiments of the present invention, but the embodiments of the present invention are not limited by the above embodiments. Any other changes, modifications, substitutions, combinations, and simplifications that do not deviate from the spirit and principle of the present invention should be regarded as equivalent alternatives and are included in the protection scope of the present invention.

The invention claimed is:

1. A method for producing a denim-effect garment, the method comprising:
   1) Printing a reactive dye ink onto a polyethylene terephthalate (PET) film to form a pattern thereby obtaining a transfer printed PET film;
   2) transfer printing a base pulp-treated fabric by attaching the transfer printed PET film thereby obtaining a denim-effect fabric;
   3) cutting, sewing, washing to soften, and drying the denim-effect fabric, thereby obtaining a denim-effect garment;
   wherein a dye of the reactive dye ink comprises one or more of K-type dye, M-type dye, KN-type dye and P-type dye; and a mass fraction of the dye of the reactive dye ink is 5%;
   wherein the base pulp-treated fabric is woven from at least one of cellulose fiber and regenerated cellulose fiber; a temperature of the transfer printing in step 2) is 10° C., a pressure of the transfer printing in step 2) is 0.1 MPa to 0.8 MPa, and a speed of the transfer printing in step 2) is 2 m/min to 25 m/min.

2. The method according to claim 1, wherein, a thickness of the PET film is 5 μm to 30 μm.

3. The method according to claim 1, wherein the base pulp comprises a hygroscopic agent, an alkali agent, an anti-reducing agent and a thickening agent.

4. The method according to claim 3, wherein the hygroscopic agent is urea; the thickening agent is one or more of sodium alginate, modified starch and modified cellulose; the alkali agent is one or more of sodium hydroxide, sodium carbonate, sodium bicarbonate and sodium silicate; and the anti-reducing agent is 3-nitrobenzenesulfonic acid sodium salt.

5. The method according to claim 1, wherein, the washing to soften in step 3) uses a softener to treat the fabric; and the washing to soften in step 3) is performed at 20° C. to 60° C. with a treatment time of 5 min-30 min.

6. The method according to claim 1, wherein step 3) further comprises steaming, washing, and shaping the denim-effect fabric.

7. The method according to claim 6, wherein the steaming is performed at a pressure of 0.1 MPa to 0.5 MPa; the steaming is performed at a temperature of 95° C. to 110° C.; and the steaming is performed for a duration of 3 min to 15 min.

8. The method according to claim 6, wherein the shaping is performed by adding a shaping additive to the denim-effect fabric and then performing a stiffening treatment on said denim-effect fabric; the shaping additive comprising one or more of natural starch, cellulose, modified starch, and guar gum.

* * * * *